L. REED.

Barrel-Hoops.

No. 7,932. Reissued Oct. 30, 1877.

Witnesses:

B. S. Clark

M. F. Clifton.

Inventor:

Louis Reed

By J. P. Lord his attorney.

UNITED STATES PATENT OFFICE.

LOUIS REED, OF NEW YORK, N. Y.

IMPROVEMENT IN BARREL-HOOPS.

Specification forming part of Letters Patent No. 147,284, dated February 10, 1874; Reissue No. 7,932, dated October 30, 1877; application filed May 11, 1877.

*To all whom it may concern:*

Be it known that I, LOUIS REED, of the city, county, and State of New York, have invented an Improvement in Barrel-Hoops, of which the following is a specification:

The invention relates to a wooden barrel-hoop, which, in the process of manufacture, is made flaring to fit the bulge of the barrel without beveling the piece or strip of which the hoop is to be formed.

Figure 1:
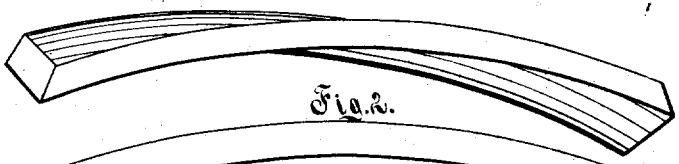
Figure 2:
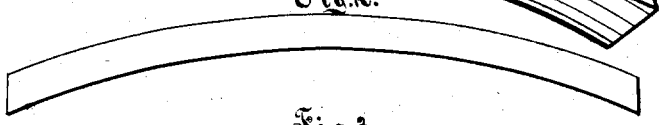
Figure 3:
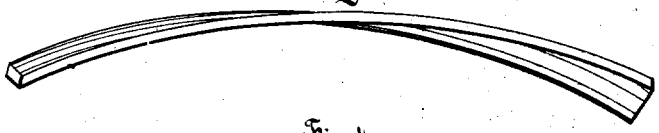
Figure 4:
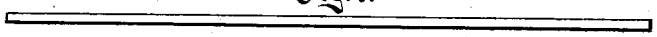
Figure 5:
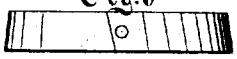
Figure 6:
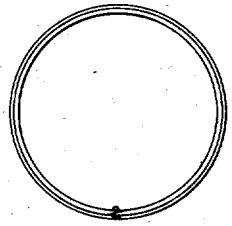

Figure 1 is a perspective view of a curved block of wood designed to be cut or sliced up to make hoops. Fig. 2 is an edge view of the same. Fig. 3 is a perspective view of a slice for a hoop cut from the blocks, Figs. 1 and 2. Fig. 4 is an edge view of the same. Fig. 5 is a side view of a hoop formed of the piece, Figs. 3 and 4. Fig. 6 is a top view of the same.

The preferable method of making this hoop consists in preparing a block of some kind of proper wood for hoops of suitable length, and as thick as the desired width of the hoops to be made from it, and curving it, as shown in Fig. 1. This permanent curve may be conveniently given to it by first steaming it, and then passing it between rollers—two below and one above, the latter arranged intermediate, the former with their lower peripheral surfaces a little below the plane of the upper peripheral surfaces of the former. This will give to the block a permanent set. It may, however, be bent by any other method most convenient. From the edge of this block I then cut or slice strips or pieces of a suitable thickness for hoops, which are represented by Figs. 3 and 4. When such a strip, one edge of which is longer than the other, is bent flatwise into the form of a hoop, the longer edge will have, of course, a greater diameter than the shorter edge, thus giving to the hoop the requisite flare to fit the taper of a barrel. Any degree of flare may be given to the hoop by the degree of curvature given to the block from which the hoops are cut. Any other suitable method of producing the flare of the hoop without beveling the strip of which the hoop is formed may be employed, the essential thing being the production in the process of manufacture of a flared hoop of equal thickness across from edge to edge, and my claim is limited to such a hoop.

I claim—

1. As a new manufacture, a wooden barrel-hoop of equal thickness across from edge to edge, made flaring to fit the taper of the barrel.

2. The method herein described of fabricating wooden flared barrel-hoops of equal thickness across from edge to edge, consisting of giving to the block of wood from which strips of which the hoops are to be made are cut a permanent curve, and then cutting from the edge of such block successive strips of substantially rectangular cross-section, which, when bent flatwise, will form hoops of equal thickness across from edge to edge.

Witness my hand this 7th day of May, 1877.

LOUIS REED.

Witnesses:

B. S. CLARK,

M. F. CLIFTON.